United States Patent
Breton et al.

(10) Patent No.: US 10,623,445 B2
(45) Date of Patent: *Apr. 14, 2020

(54) ENDPOINT AGENT FOR ENTERPRISE SECURITY SYSTEM

(71) Applicant: Malwarebytes Inc., Santa Clara, CA (US)

(72) Inventors: Kevin Douglas Breton, Palmetto, FL (US); Mark Patton, Santa Clara, CA (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,335

(22) Filed: Feb. 22, 2019

(65) Prior Publication Data

US 2019/0190956 A1    Jun. 20, 2019

Related U.S. Application Data

(63) Continuation of application No. 15/703,970, filed on Sep. 13, 2017, now Pat. No. 10,257,232.

(51) Int. Cl.
*H04L 29/06* (2006.01)
*G06F 21/50* (2013.01)
(Continued)

(52) U.S. Cl.
CPC .............. *H04L 63/20* (2013.01); *G06F 21/50* (2013.01); *G06F 21/57* (2013.01); *H04L 63/0823* (2013.01); *H04L 63/145* (2013.01); *H04L 41/0893* (2013.01); *H04L 63/102* (2013.01); *H04L 63/1416* (2013.01); *H04L 63/1433* (2013.01)

(58) Field of Classification Search
CPC ................................ H04L 63/20; G06F 21/50
See application file for complete search history.

(56) References Cited

U.S. PATENT DOCUMENTS

| 7,181,620 | B1 * | 2/2007 | Hur .......................... H04L 9/083 713/168 |
| 8,683,598 | B1 | 3/2014 | Cashin |

(Continued)

OTHER PUBLICATIONS

United States Office Action, U.S. Appl. No. 15/703,970, dated Apr. 17, 2018, 12 pages.

(Continued)

*Primary Examiner* — William S Powers
(74) *Attorney, Agent, or Firm* — Fenwick & West LLP

(57) ABSTRACT

An endpoint security agent facilitates a security policy on an endpoint computing device. The endpoint agent comprises an engine and one or more plugins that each provide a particular security feature. The endpoint agent receives a policy from a cloud server specifying one or more plug-ins used by the policy and configuration of those plug-ins. The endpoint agent retrieves, installs, and configures the one or more plugins. The endpoint agent updates a communication table with command subscription information obtained from each installed plugin indicating command types subscribed to by each plug-in. When a command is received, a lookup of the command type is performed in the table, and the command is sent to the subscribing plugin.

20 Claims, 5 Drawing Sheets

(51) Int. Cl.
    *G06F 21/57*           (2013.01)
    *H04L 12/24*          (2006.01)

(56) References Cited

U.S. PATENT DOCUMENTS

| | | | | |
|---|---|---|---|---|
| 2002/0073242 | A1* | 6/2002 | Peloquin | G06F 3/0607 |
| | | | | 719/313 |
| 2010/0319004 | A1* | 12/2010 | Hudson | G06F 9/5072 |
| | | | | 719/313 |
| 2013/0145437 | A1* | 6/2013 | Zaitsev | G06F 21/56 |
| | | | | 726/4 |
| 2013/0219493 | A1* | 8/2013 | Banzhof | H04L 63/1433 |
| | | | | 726/22 |
| 2015/0312256 | A1* | 10/2015 | Seibert, Jr. | H04L 63/0807 |
| | | | | 726/8 |
| 2017/0286688 | A1* | 10/2017 | Ionescu | G06F 21/577 |

OTHER PUBLICATIONS

United States Office Action, U.S. Appl. No. 15/703,970, dated Nov. 16, 2017, 11 pages.

\* cited by examiner

Plug-in Install Process
400

ENDPOINT AGENT FOR ENTERPRISE SECURITY SYSTEM

CROSS REFERENCE TO RELATED APPLICATIONS

This application is a continuation of U.S. application Ser. No. 15/703,970, filed Sep. 13, 2017, now U.S. Pat. No. 10,257,232, which is incorporated by reference in its entirety.

FIELD OF ART

The present disclosure relates generally to computer security and more specifically to managing endpoints in a distributed security system.

BACKGROUND

Malware is constantly evolving and therefore software designed to combat malware must be updated regularly. In large-scale systems, it is often challenging to distribute updates or send commands to large numbers of connected endpoint devices in an automatic and efficient way.

SUMMARY

A method is disclosed for installing a plug-in to an endpoint security agent executing on an endpoint in a networked computer environment. The method comprises receiving a policy from a server. The policy specifies an operating configuration of the endpoint security agent to provide security to the endpoint. A plug-in for installing is specified by the received policy. The plug-in is retrieved from a cloud server and configured according to the policy-specified operating configuration information. Once the plug-in is configured, command subscription information is obtained from the plug-in. This information specifies a set of command types to which the plug-in is subscribed. A communication table is updated with this obtained command subscription information. This communication table stores associations between the plug-in and each of the set of command types.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A scalable cloud-based endpoint security system facilitates implementation of a security policy on a plurality of endpoints. Each endpoint has an endpoint security agent that implements security functions and communicates with a cloud security server. Various plug-ins are installable on the endpoint agent that each facilitate a particular security or administrative capability of the endpoint agent. The plug-ins can beneficially be added or removed without a full re-installation of the endpoint agent. In addition, the endpoint agent need not be stopped and restarted when new plugins are installed. Furthermore, the endpoint agent may add and remove plug-ins and communicate with plug-ins in a way that is agnostic to the particular type of plug-in. This enables the same endpoint agent to operate with different plug-ins as they become newly available or as the security policy changes without otherwise updating the executable instructions of the endpoint agent.

Figure 1:
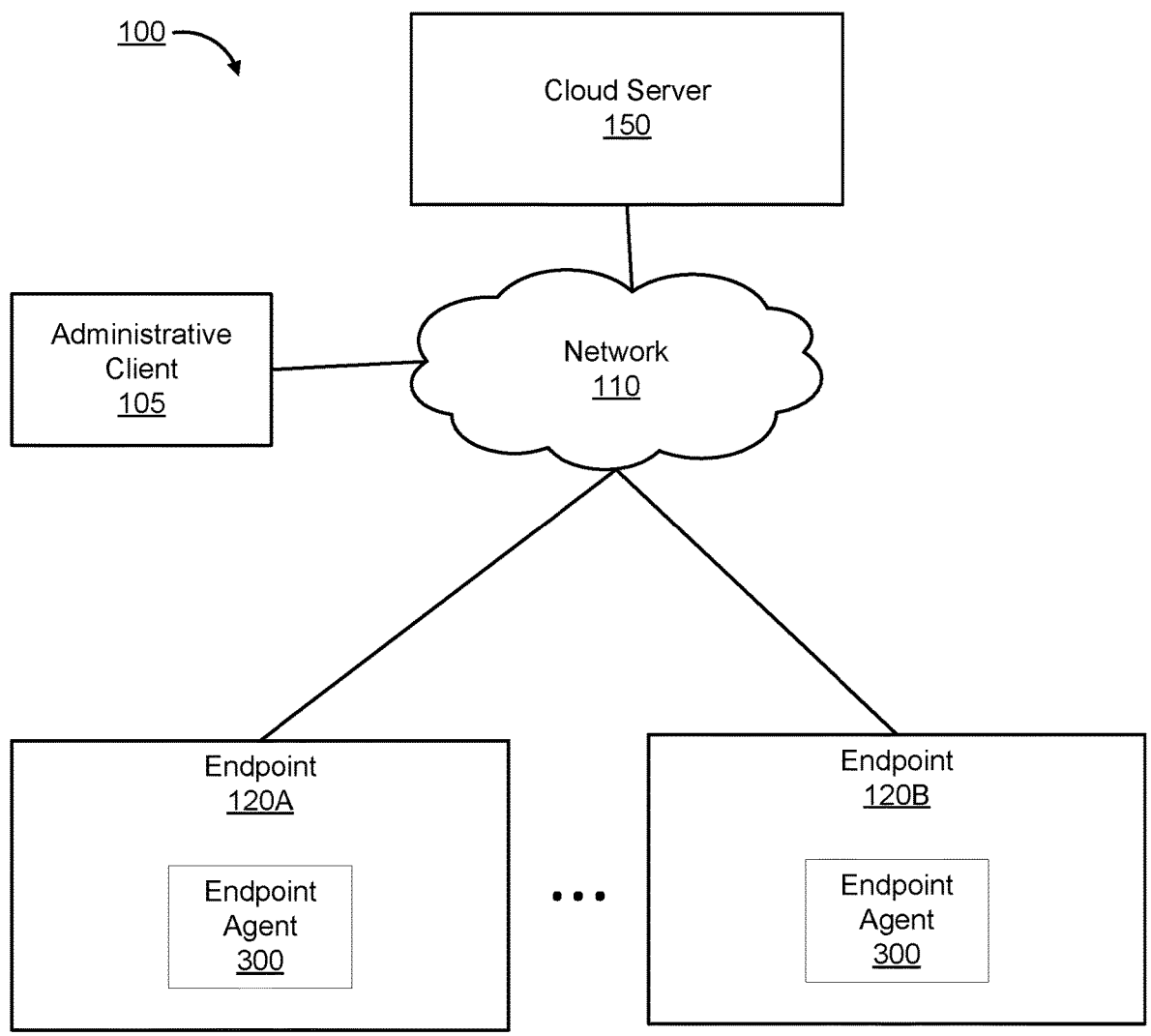
FIG. 1 is a high-level block diagram illustrating an embodiment of a system environment for managing a set of computing devices.

FIG. 1 is a high-level block diagram illustrating a system environment 100 for managing a set of computing devices. The system environment 100 comprises an administrative client 105, a network 110, a cloud server 150, and a set of endpoint computing devices (hereafter referred to as "endpoints") 120. The system environment 100 may include different or additional entities.

The administrative client 105 is a computer system configured to receive inputs from a network administrator to configure a network security policy associated with an enterprise and communicate the network security policy to the cloud server 150 via the network 110. The administrative client 105 may furthermore retrieve information relating to the network security policy from the cloud server 150 via the network 110 and present the information to the administrator. In an embodiment, the administrative client 105 executes a web browser application to access an administrative web page hosted by the cloud server 150. The web page is secured by requiring log in credentials or other authentication technique to limit access to the administrative web page to a device or individual having appropriate privileges. The administrative web page may enable the administrator, via the administrative client 105, to configure various security settings for the endpoints 120 on the network 110, access status information relating to the endpoints, issue commands to endpoints, perform backups of the endpoints, or perform other administrative tasks.

The network 110 represents the communication pathways between the administrative client 105, the cloud server 150, and the endpoints 120. In one embodiment, the network 110 includes a wide area network (e.g., the Internet). The network 110 can also include one or more enterprise local area networks that utilize dedicated or private communications links that are not necessarily part of the Internet. For example, an enterprise computing environment may include endpoints 120 residing on different local area networks associated with the same enterprise. An administrative client 105 may also reside on a local area network associated with the enterprise. A wide area network (e.g., the Internet) may connect the one or more local area networks of the enterprise to each other and with the cloud server 150. Other endpoints 110 may be coupled to the wide area network without necessarily being coupled to the local area network.

In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP) and its secure version (HTTPS), the secure web socket (WSS), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), JavaScript Object Notation (JSON), the wireless access protocol (WAP), the short message service (SMS) etc.

The data on the network 110 may also be communicated via a persistent low overhead connection such as Web Socket connection. The Web Socket protocol enables full duplex communication over a single TCP connection. The Web Socket protocol facilitates real-time data transfers via a standardized protocol that enables a server to send content to a client without being solicited by the client, and allows messages to be communicated in both directions while keeping the connection open.

In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each endpoint 120 comprises one or more computing devices capable of processing data as well as transmitting and receiving data via the network 110. For example, an endpoint 120 may be a desktop computer, a laptop computer, a mobile phone, a tablet computing device, an Internet of Things (IoT) device, or any other device having computing and data communication capabilities. In the illustrated embodiment, there are N endpoints, where N may comprise any number of end points (e.g., tens, hundreds, or thousands of endpoints 120 or more). Furthermore, the number of endpoints 120 may change over time as endpoints come online and go offline. The endpoints 120 are each configured to execute an endpoint security agent 300 (e.g., a security application) that protects the endpoints from malware. For example, the endpoint agent 300 may include capabilities such as a real-time protection capability to prevent the downloading or installation of malware, a scanning capability to detect existing malware on the endpoint 120, and a remediation capability to quarantine and remove detected malware. The endpoint agent 300 may furthermore receive commands from the cloud server 150 to cause the endpoint agent 300 to execute a function such as running a scheduled scan, performing a backup, updating a plug-in that implements various security features (as will be described in further detail below), and updating malware definitions used to detect malware.

The cloud server 150 facilitates implementation of a security policy on a plurality of endpoints 120 that form part of an enterprise network. Implementing the security policy may include, for example, deploying or updating the endpoint agents 300 on the endpoints 120, configuring the endpoint agents based on the security policy, sending commands to the endpoints to perform various tasks such as running or scheduling scans or remediating vulnerabilities, and obtaining various security-related data from the endpoints such as state information or scan results. The security policy may be modified via commands received from the administrative client 105 as described above. A logical diagram illustrating an example embodiment of a cloud server 150 is described in greater detail in the description of FIG. 2 below.

Unlike a conventional enterprise security server that typically resides on a local area network of the enterprise and may be physically co-located with the local area network and the endpoints 120, the cloud server 150 instead may reside in a cloud environment remote from the enterprise local area network and connected to it via a wide area network such as the Internet. The cloud environment in which the cloud server 150 executes may be maintained by a third-party cloud computing provider that provides shared computer processing and data storage resources to the enterprise in an on-demand fashion. In this cloud environment, the cloud server 150 is not necessarily implemented on a single physical server and does not necessarily comprise only a single physical storage device. Instead, the cloud server 150 may be implemented as one or more physical servers, one or more virtual servers, or a combination of physical and virtual servers.

Controlling security policies by a cloud server 150 in a cloud environment has several advantages over a conventional security architecture in which a local security server operates on a local area network of the enterprise. First, controlling an enterprise security policy by the cloud server 150 in the cloud environment simplifies the ability of third-party providers to administer some or all aspects of the enterprise security policy because the third-party provider does not need direct access to the enterprise local area network. Thus, an enterprise can more easily offload some of the administrative burden of managing enterprise security to a dedicated third party service. Second, controlling an enterprise security policy at the cloud server 150 in the cloud environment may simplify control over endpoints 120 that are not on the enterprise local area network but are connected to the Internet because communications do not have to go through the a firewall of the local area network. Thus, an enterprise may avoid having to update endpoints via virtual private network (VPN) connections or other complex networking tools. Third, implementing the security server as a cloud server 150 in the cloud environment simplifies scalability of the system as the number of endpoints 120 changes. For example, instead of an enterprise having to acquire and configure more physical servers as the number of endpoints 120 increases and the capacity limits are reached, the enterprise may simply obtain control of additional available computing resources in the cloud environment. Using existing third-party cloud computing services, this type of scaling can be achieved in a seamless and substantially automated manner without significant burden on the administrator.

While the system environment 100 is discussed herein as serving a single enterprise, the environment 100 may include multiple instances of the cloud server 150 each serving different enterprises and having different managed endpoints 120. Furthermore, a single cloud server 150 may serve multiple different enterprises managing different sets of endpoints 120 according to different security policies configured by respective administrative clients 105. Additionally, computing and storage resources of the cloud server 150 may be shared with other enterprises and used in an on-demand fashion.

Figure 2:
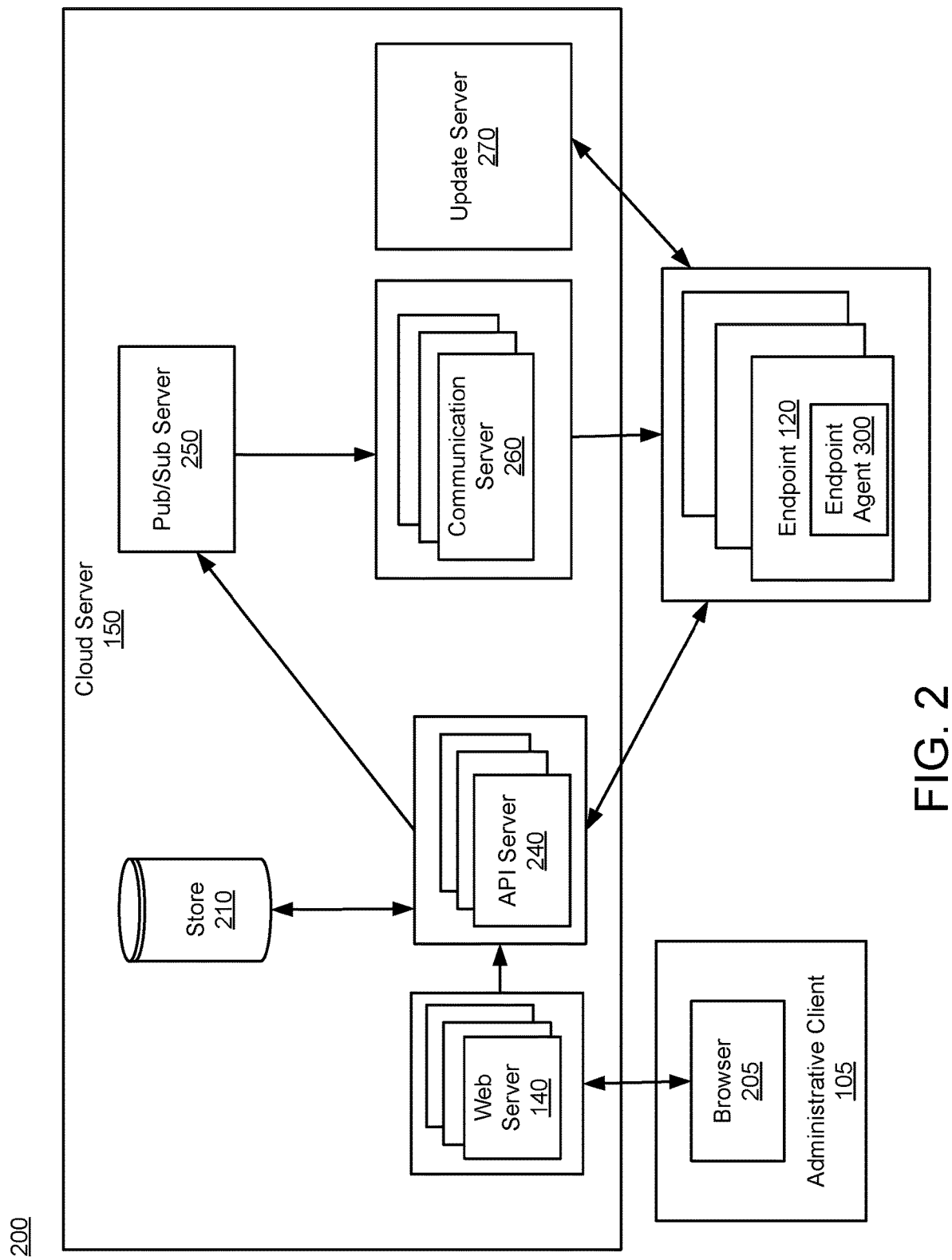
FIG. 2 is a diagram illustrating an embodiment of a cloud server for a cloud-based endpoint security system.

FIG. 2 is a block diagram illustrating an example embodiment of a cloud server 150 communicating with a browser 205 of the administrative client 105 and the endpoints 120. Endpoint security agents 300 are installed on each endpoint 120. The cloud server 150 comprises one or more instances of a web server 140, a data store 210, one or more instances of an application programming interface (API) server 240, a publication/subscription (pub/sub) server 250, one or more instances of a communication server 260, and an update server 270.

In the diagram of FIG. 2, the connections represent logical connections between components and do not necessarily represent direct physical connections. For example, the connections may occur over a network. Furthermore, the servers 140, 240, 250, 260, 270 and store 210 of the cloud server 150 illustrated in FIG. 2 represent functional components of the cloud server 150 and do not necessarily represent different physical servers. For example, the servers 140, 240, 250, 260, 270 may each be implemented as a virtual server. Multiple virtual servers may execute on a single physical server or a single virtual server may be distributed across multiple physical servers. Furthermore, the data store 210 may comprise a cloud storage system that may occupy only a portion of a shared physical storage device or may be distributed across multiple physical storage devices.

The server components of the cloud storage 150 may be implemented as one or more processors and one or more non-transitory computer-readable storage media that store computer-readable storage instructions that when executed by the one or more processors, cause the one or more processors to carry out functions attributed to the respective servers 140, 240, 250, 260, 270 described herein.

The browser 205 runs on the administrative client 105. The browser 205 is a conventional browser that runs on a client device and provides the administrator with a user interface with which to interact with the web server 140. The administrator uses a web site, accessed using the web server 140, to access an account with a unique account identifier. This account is used to send commands to the endpoints 120 (e.g., to configure the endpoints or perform a specified task). Configuration is done, for example, on a machine-by-machine basis, enterprise-wide, or on groups of endpoints. Configuration includes setting security policies (e.g., firewall policies, real-time protection policies), scheduling scans, updating malware definitions, or causing actions such as rebooting the endpoints. Furthermore, the configuration may provide machine identifiers for each of the endpoints 120 to be managed by the cloud server 150.

The web server 140 provides a web interface (e.g., a web page) that is accessible to the administrative client 105 using the browser 220. The web server 140 processes requests received from the browser 205 (e.g., via HTTP, HTTPS, or other protocol) and delivers one or more web pages to the administrative client in response to the requests. The one or more web pages may include an interface to enable an administrator to configure a security policy of the endpoints 120, send commands to the endpoints 120, or obtain various information from the cloud server 150 or endpoints 120. In an embodiment, multiple mirrored instances of the web server 140 may be available that each serve substantially identical web pages and can operate interchangeably. For example, different instances of the web-server 140 may serve different administrative clients 105 based on different geographical locations or other criteria.

The API server 240 provides business logic that facilitates implementation of the security policy. The API server 240 receives commands (e.g., to update a configuration or perform a specified task) from the web server 140 representative of inputs provided by the administrator via the browser 205. The API server 240 may communicate using an API comprising a limited predefined set of commands that can be processed by the API server 240. For example, in one embodiment, a REpresentational State Transfer (REST) abstraction may be used to implement the API. The API server 240 processes configuration changes to the security policy based on the commands and stores configuration changes to the data store 210. For example, the API server 240 may process the inputs to determine identifiers for a plurality of endpoints 120 that are targets of a command and update records associated with those endpoints 120 in the data store 210. Configuration changes may include changes to a version of the endpoint agent 300 executing on the endpoints 120, changes to a firewall configuration, changes to a scheduled scanning frequency for scanning the endpoints for malware, disabling or enabling of various optional security features of the endpoints, changes to parameters controlling various real-time protection, scanning, or remediation tasks performed by the endpoint agent 300, or other security-related configurations. Other commands that can be issued to the endpoints 120 via the API server 240 may include, for example, initiating a manual scan on an endpoint 120 or requesting state information of an endpoint 120 indicating, for example, an operating system executing on the endpoint, an version of the endpoint agent 300 executing on the endpoint, malware or vulnerabilities detected on the end point 120, remediation actions taken on the endpoint, a connectivity state of the endpoint, or other information relating to the current operating state of the endpoint.

Upon the API server 240 determining to send a command to one or more endpoints 120, the API server 240 sends a connection request message to the pub/sub server 250 that includes a machine identifier indicating an endpoint 120 that is the target of the message. The message may furthermore include an identifier for an instance of the API server 240 sending the message and a message identifier that uniquely identifies the message. In an embodiment, the message may furthermore include message type information indicating the type of data the API server 240 wants to send to the endpoint 120 (e.g., a configuration update, a scanning command, a status request, etc.). In some cases, where a substantial data transfer to the endpoint 120 is not part of the request, the message may include a direct command, such as directing the endpoint to perform a scan. The API server 240 may store the message identifier to the data store 210 in association with the targeted endpoint 120 upon sending the message. The API server 240 may furthermore store whether or not an acknowledgement was received from the endpoint 130 for the message.

The API server 240 may also receive a connection request from an endpoint 120 and connect to the endpoint 120 in response to the request. Once connected, the API server 240 may send the command and associated data (e.g., configuration data) to the endpoints 120 or receive information from the endpoint. Communications between the API server 240 and the endpoint 120 may utilize the commands in the API associated with the API server 240. In an embodiment, a connection between an endpoint 120 and the API server 240 is generally initiated by the endpoint in response to the endpoint receiving a connection request message described above, although the API server 240 may initiate the connection in certain situations. In order to reduce bandwidth requirements of the API server 240, the connections with the endpoints 120 may be made only when the endpoints have data to communicate to the API server 240 or when the endpoints request data from the API server 240. After the data is communicated, the connection may be terminated.

In an embodiment, the API server 240 and the endpoints 120 communicate with each other using hypertext transfer protocol (HTTP) over a transport layer security (TLS) protocol. The TLS protocol provides encrypted HTTP communications that enables data privacy and ensures data integrity.

In some embodiments, multiple instances of the API server 240 are utilized for scalability. Each instance of the API server 240 may perform identical functions and may operate in parallel to couple to different instances of the web servers 140 and to different endpoints 120. Instances of the API server 240 may be dynamically generated (e.g., as new virtual servers) as the number of endpoints 120 or other factors change. For example, new instances of the API server 240 may be generated as virtual servers based on the number of endpoints 120 being administered by the cloud server 150 as specified in the data store 210. In an embodiment, a separate control server (not shown) may control scaling of the number of API servers 240 based on load, configuration parameters, throughput, or other factors. For example, if a large number of endpoints 120 are receiving an update at the same time, the control server may generate more instances of the API server 240 to accommodate the increased load, and then scale back down once the action is completed. In an embodiment, the control server may be administered by the third party cloud server host instead of by the enterprise in order to reduce the administrative burden of the enterprise. Alternatively, the enterprise may control scaling of the API server 240 by either automated or manual control (e.g., via the administrative client 105).

The pub/sub server 250 receives the messages from the one more instances of the API server 240 and stores the messages in a queue. In an embodiment, the queue of the pub/sub server 250 can be a first-in, first-out (FIFO) queue. Alternatively, the queue may intelligently prioritize messages based on a type of message, the target of the message, or other factors. The pub/sub server 250 publishes messages from its queue to subscribing servers which may include one or more instances of the communication server 260.

The communication server 260 provides message processing capabilities to process messages received from the pub/sub server 250. Multiple instances of the communication server 260 can instantiated on the cloud server 150 with each communication server serving a subset of the endpoints 120 and maintaining a list of identifiers for the endpoints it serves. The number of communication servers 260 can be scaled based on the number of endpoints 120 and the volumes of messages. In an embodiment, the number of communication servers 260 can adapt dynamically by automatically generating or terminating virtual servers based on the number of endpoints 120 (as specified in the data store 210) or other factors. In an embodiment, a separate control server (not shown) may control scaling of the number of communication servers 260 based on load, configuration parameters, throughput, or other factors. The control server may send a notification to the administrative client 105 indicating the change in number of communication servers 260. In an embodiment, the control server may be administered by the third party cloud server host instead of by the enterprise in order to reduce the administrative burden of the enterprise. Alternatively, the enterprise may control scaling of the communication servers 260 by either automated or manual control (e.g., via the administrative client 105).

Each instance of the communication server 260 may subscribe to all messages transmitted by the pub/sub server 250. Upon receiving a message, the communication server 260 determines whether it serves the endpoint specified as the target of the message (e.g., by comparing the identifier against its stored list of endpoint identifiers). If the communication server 260 determines that the message is targeted to an endpoint 120 that it serves, the communication server 260 transmits the message to the appropriate endpoint 120.

Each instance of the communication server 260 maintains a persistent connection to the one or more endpoints 120 that it serves. The persistent connections between the communication server 260 and the endpoints 120 may be, for example, Web Socket connections. The persistent connection enables persistent connectivity and real-time or near real-time communication from the communication server 260 to a connected endpoint 120 without the endpoint 120 having to request the data from the communication server 260. This enables the communication server 260 to provide the messages to the endpoints 120 quickly and with very low overhead.

In an embodiment, a Socket.IO protocol is employed in which endpoints 120 initially communicate using HTTP or HTTPS polling and upgrade to a Web Socket or Secure WebSockets (WSS) connection. If the upgrade is unavailable (e.g., because the endpoint 120 is behind a proxy), the endpoints 120 may continue using HTTP polling to perform communications as close to real-time as possible.

Upon receiving a connection request message from the communication server 260, the endpoint 120 requests a connection to the API server 240 that originated the message (e.g., using an identifier in the message). The endpoint 120 and API server 240 then connect and communicate the relevant data. Upon completing the data transfer, the connection between the API server 240 and the endpoint 120 may be terminated. Alternatively, the endpoint 120 may receive a direct command (e.g., a scan command) from the communication server 260 and execute it. The endpoint 120 may then connect to the API server 240 to send scan results.

The type of connection between the API server 240 and the endpoint 120 (e.g., a HTTP over TLS connection) is typically higher latency and requires more overhead than the persistent connection between the communication server 260 and the endpoint. However, the type of connection between the API server 240 and the endpoint 120 is better suited for large data transfers and beneficially ensures data privacy and integrity.

The update server 270 provides updates to the endpoints agents 300 of the endpoints 120. The updates may include, for example, updated malware detection rules used to detect malware in a scan, updated real-time protection rules, or updated features adding new security capabilities to the endpoint agent 300. The update server 270 may provide updates in response to requests for updates received from the endpoint agents 300 or may push updates to the endpoints agents 300 when available.

The data store 210 maintains a database specifying various information pertaining to the endpoints 120. For example, the data store 250 stores security policy information for an enterprise such as, for example, parameters associated with the endpoint agents 300, firewall configurations, scan schedules, and scan results. The data store 210 also maintains unique machine identifiers for all of the endpoints 120. The data store 210 may store, in association with each of the machine identifiers, a state of the endpoint 120 and identifiers associated with messages sent to the endpoint 120. In addition, the store 210 maintains unique identifiers for all of the accounts that have access to the system via the administrative client 105.

Endpoints 120 may come online or offline at various times and may therefore miss messages from the API server 240 if they are sent when the endpoint 120 is offline. When an endpoint 120 first comes online (either from an offline state or when a new endpoint is registered in the data store 210), the endpoint may automatically request a connection to the API server 240. The API server 240 may compare an identifier for the last message it sent that was acknowledged by the endpoint 120 against the data store 210 to determine if the endpoint 120 missed any messages while offline. If the API server 240 determines that the endpoint 120 missed any messages, the API server determines which messages were missed and sends these messages if the messages have not expired. The messages may include messages related to configuration changes and commands. In an embodiment, certain commands may expire from the data store 210 after a time period. For example, if an endpoint 120 misses a scan command, the scan command may be canceled after a predefined time period (e.g., 24 hours).

The endpoint agent 300 resides on the endpoint 120 and executes security and administrative functions on the endpoint 120. For example, the endpoint agent 300 facilitate tasks such as scanning for malware, preventing malware from being installed, performing remedial actions for compromised endpoints 120, and reporting security information to the cloud server 150. The components of the endpoint agent 300 are discussed in greater detail in the description of FIG. 3.

A benefit of the described architecture of the cloud server 150 is that the required bandwidth of the API server 240 may be reduced because the endpoints 120 (which may exist in very large numbers) need not constantly poll the API server 240 for updates. Instead, the endpoints 120 only connect to the API server 240 when they determine that an update or command is available based on the connection request message received via the communication server 260. Furthermore, by utilizing a communication server 260 with a persistent connection to the endpoint 120, the messages can be communicated to the endpoint 120 quickly without the endpoint 120 constantly polling the communication server 260. The architecture also enables the number of instances of the API server 240 and the number of instances of the communication server 260 to scale independently. The number of instances of the communication server 260 is directly related to the total number of endpoints 120 that the cloud system is managing. If a new account is added with large number of endpoints 120, or new endpoints 120 are deployed within an existing account, each of those endpoints 120 will try to establish a connection with the communication server 260 and that may trigger new instances of communication servers 260. On the other hand, if a configuration setting is changed in an operating environment that has larger number of endpoints 120, all of those endpoints 120 of that environment may try to download their settings from the API server 240 at the same time which may increase the load on the API servers 240 and that may trigger new instances of the API server 240. Once all the settings are downloaded, the load on the API servers 240 may reduce and thus the API server 240 may again scale down back to an effective operating level.

Further still, the architecture beneficially enables updating of the API server 240 independently of updating of the communication server 260. The independent updating enables the cloud server 150 to be updated in a more efficient manner with less disruption to the endpoints 120 it serves.

Figure 3:
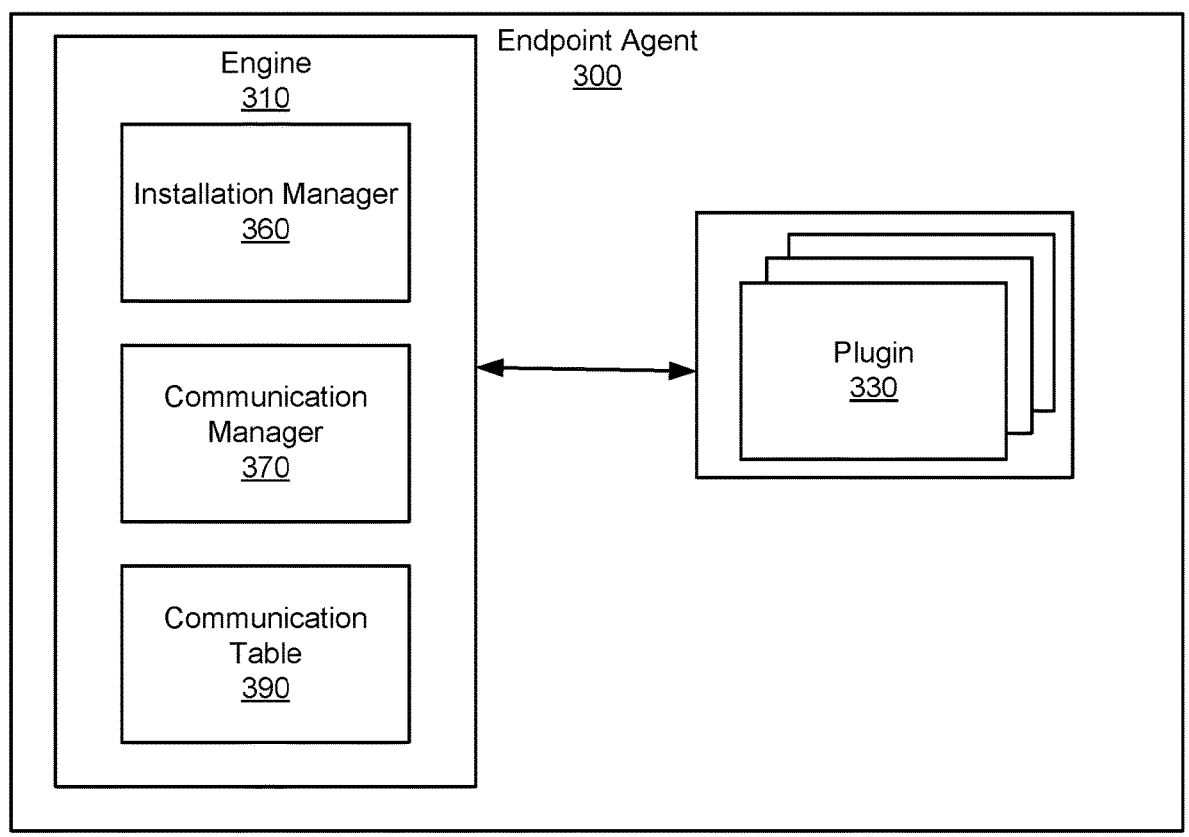
FIG. 3 is diagram illustrating an embodiment of an endpoint agent.

FIG. 3 is a diagram illustrating an embodiment of the endpoint agent 300. The endpoint agent 300 comprises one or more plug-ins 330 and an engine 310. The engine 310 comprises an installation manager 360, a command manager 370, and a communication table 390. The components of the endpoint agent 300 may be implemented as instructions stored to a non-transitory computer-readable storage medium on the endpoint 120 that are executed by a processor on the endpoint 120 to carry out the functions attributed to the components described herein.

The plug-ins 330 comprise computer-executable modules that each perform one or more administrative or security functions. Each plug-in 330 operates as an add-on or extension to the endpoint agent 300 rather than as a standalone application. For example, in an embodiment, the plug-ins cannot operate independently of the engine 310 as separate applications. Rather, the plug-ins 330 each support a particular feature of the endpoint agent 300 that enables the endpoint agent 300 to be customized with different features in a modular manner. For example, an incident response plug-in performs malware detection and remediation functions. This plug-in may perform functions such as scanning for malware on a scheduled basis or in a response to a command, performing remedial actions to remove detected malware, and reporting scan results to the cloud server 150. In another example, a real-time protection plug-in performs real-time protection features to protect the endpoint against malware before the malware is downloaded or installed. The real-time protection plug-in may perform functions such as scanning downloaded files, blocking installations of detected malware, and protecting against ransomware. In another example, an administrative plug-in performs various administrative functions, such as providing information to a user interface on the endpoint 120 or to the cloud server 150 about the state of the endpoint 120 including information about the endpoint 120 such as the operating system, computer usage, space available, configuration data, or running processes. In yet another example, a remote desktop plug-in may include remote access features to enable an administrator to remotely access the endpoint 120 in order to diagnose or remediate security issues on the endpoint 120. Different plug-ins 330 may be designed to provide similar functions to endpoints 120 having different operating systems (WINDOWS, MAC, etc.).

The endpoint agent 300 may operate any number of plug-ins 330 in parallel. Plug-ins 330 may be added, removed, or updated on the endpoint agent 300 to change the specific set of feature available on the endpoint agent 300.

The engine 310 controls installation, removal, updating, and verification of the plug-ins 330 and facilitates communication between the plug-ins 330 and the cloud server 150. The engine 310 is plug-in-agnostic, meaning that engine 310 can facilitate the installation of new plug-ins using the same generic executable instructions that are agnostic to the type of plug-in being installed. In other words, no update to the executable instructions of the engine 310 is necessary to install a new plug-in 330, even one that was not available at the time the engine 310 was installed. Furthermore, the engine 310 may facilitate communications to and from the plug-ins using the same generic executable instructions that are independent of the particular plug-ins that are installed and the particular set of commands used by the plug-in 330. As a result, the engine 310 need not be updated to include a new communication protocol each time a new plug-in 330 is installed.

The installation manager 360 manages installation of plug-ins 330 on the endpoint agent 300. A new plug-in 330 may be installed when the endpoint agent 300 receives an updated security policy from the cloud server 150 that specifies one or more plug-ins 330 that are not already installed on the endpoint agent 300. For example, the policy may contain a list of plug-ins 330 to be employed as part of the policy. The policy may also include respective links (e.g., uniform resource identifiers) specifying an address at the update server 270 from where the plug-in 330 can be downloaded. The policy may furthermore comprise configuration data for configuring the plug-in according to various configurable parameters. For example, a security policy may specify installation of an incident response plug-in and may specify configuring the plug-in to execute a malware scan according to a particular schedule (e.g., once a week). In another example, a security policy may specify installation of a real-time protection plug-in and configure the plug-in to block installation of certain type of files from untrusted sources. In another example, the security policy may specify installation of a remote desktop plug-in and specify a configuration that enables a limited set of trusted administrators to access the desktop remotely.

In response to receiving the security policy, the installation manager 360 retrieves the plug-in 330 or plug-ins 330 from the update server 270. For example, the update server 270 may use the respective links provided with the security policy. Alternatively, the policy may only identify the plug-in by an identifier and not necessarily provide a link. In this case, the installation manager 360 may provide the identifier to the update server 270 and the update server 270 responds with a link to download the identified plug-in. The installation manager 360 installs the plug-in 330 and configures the plug-in 330 in accordance with the configuration information from the policy.

In an embodiment, when a plug-in 330 is installed, the installation manager 360 may obtain and verify a digital signature from the plug-in 330 to ensure that the plug-in 330 has not been tampered with. Furthermore, a plug-in 330 may verify a digital signature of the installation manager 360 upon installation to ensure that it is being installed on a legitimate endpoint 120. If either of these security checks fails, the plug-in 330 is not loaded.

Upon installing a new plug-in 330, the installation manager 360 receives, from the plug-in 330, a list of command types (e.g., identified by respective type identifiers) to which the plug-in 330 subscribes. The installation manager 360 configures a communication table 390 that maps the command types to the subscribing plug-in 330. Configuring the communication table 390 may include adding new command types (e.g., with new type identifiers) to the communication table 390 that were not previously stored in the table, or may include updating the communication table 390 to re-map an existing command type to indicate a subscription from the new plug-in 330.

Beneficially, the installation manager 360 receives the command types for a particular plug-in 330 from the plug-in 330 itself when it is installed. This enables the communication table 390 to be automatically configured for communication with a new plug-in 330 without any other information about the particular command set used by a given plug-in 330. Furthermore, the installation manager 360 enables communication with the new plug-in 330 without the executable instructions of the engine 310 requiring an update to accommodate the new plug-in 330.

The communication manager 370 facilitates communications between the cloud server 150 (e.g., the API server 240 or communication server 260) and the plug-ins 330. For example, the communication manager 370 may facilitate messages received from the communication server 260 affecting specific plug-ins 330 or may facilitate data transfers between the API server 240 or communication server 260 and a particular plug-in 330. The communications may comprise, for example, a message from the cloud server 150 containing a command that causes the plug-in 330 to take a particular action. Communications may also be sent from the plug-in 330 to the cloud server 150 to provide information to the cloud server 150 such as scan results or state information. The messages received at the communication manager 370 from the cloud server 150 are encapsulated in a generic format. For example, the message may include a type identifier that identifies the command type and a command field that includes the plug-in specific command. Upon receiving a message, the communication manager 370 performs a look-up in the communication table 390 that maps the type identifier to the one or more plug-ins 330 that subscribes to that command type. The communications manager 370 then routes the command to the subscribing plug-in 330. The plug-in 330 executes the command and may generate a response that is sent back to the communication manager 370. The communication manager 370 may format the response from the plug-in 330 (which may include adding an identifier identifying the plug-in 330 that provided the response data) and send the response to the cloud server 150. If the communications manager 370 receives a message indicating a command type to which no plug-in is subscribed, it may return a message to the cloud server 150 notifying the cloud server 150 that the command does not apply to any installed plug-in 330.

In an embodiment, the communication manager 370 communicates with the plug-ins 330 according to a language-independent data format such as a JavaScript Object Notation (JSON) format.

The communication table 390 stores a mapping between command types and one or more plug-ins 330 that subscribes to the command type. For example, each command type may be represented by a command identifier and each plug-in 330 may be represented by an address or other identifier associated with the plug-in 330. The communication table 390 may be queried when a command is received by the communication manager 370 to identify subscribing plug-ins 330 for the command. Furthermore, the communication table 390 may be updated when plug-ins 330 are added or removed.

Figure 4:
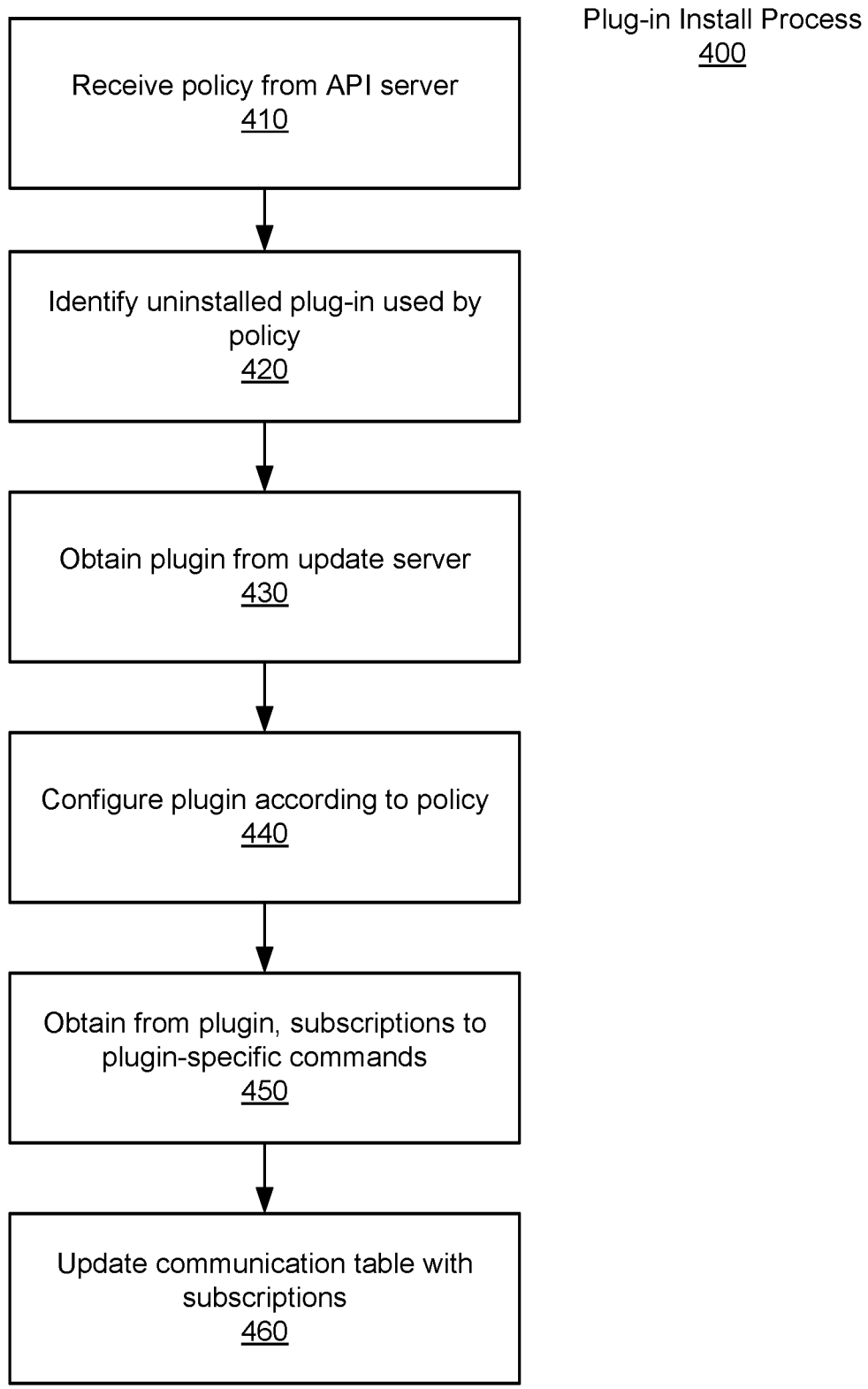
FIG. 4 is a diagram illustrating an embodiment of a plug-in installation process for a cloud-based endpoint security system.

FIG. 4 is a flow diagram illustrating an embodiment of a plug-in installation process 400 performed by the endpoint agent 300. The endpoint agent 300 receives 410 a policy from the API server 240. The policy may include instructions for scheduling scans, updating security features, or other instructions. The policy may furthermore specify one or more plug-ins 330 to carry out the security policy and configuration data for configuring the plug-ins 330. In some embodiments, the policy is based on inputs provided by an administrator through the administrative client 105 and sent to the web server 140 via the web interface.

The endpoint agent 300 identifies 420 the plug-in 330 (or multiple plug-ins 330) used by the policy and corresponding identifiers for the plug-ins or links to addresses at the update server 270 where the respective plug-ins 330 can be obtained. If the one or more plug-ins 330 specified by the policy are not already installed, the endpoint agent 300 communicates with the update server 270 to obtain 430 the specified one or more plug-ins 330 from the update server 270 and install the one or more plug-ins 330. If the policy does not require a specific plug-in 330 that is installed at the endpoint agent 300, the endpoint agent 300 may remove the already installed plug-in 330.

The endpoint agent 300 configures 440 the one or more plug-ins 330 in accordance with the configuration data specified in the policy obtained from the API server 240. The engine 310 of the endpoint agent 300 obtains 450 a subscription list indicating command types subscribed to by the plug-in 330. The engine 310 updates 460 a communication table 390 with the subscription information for the installed plug-in 330. For example, the communication table 390 may be updated to indicate the command types subscribed to by the plug-in 330, or the communication table 390 may be updated to add command types subscribed to by the plug-in 330 that were not previously stored in the table.

Figure 5:
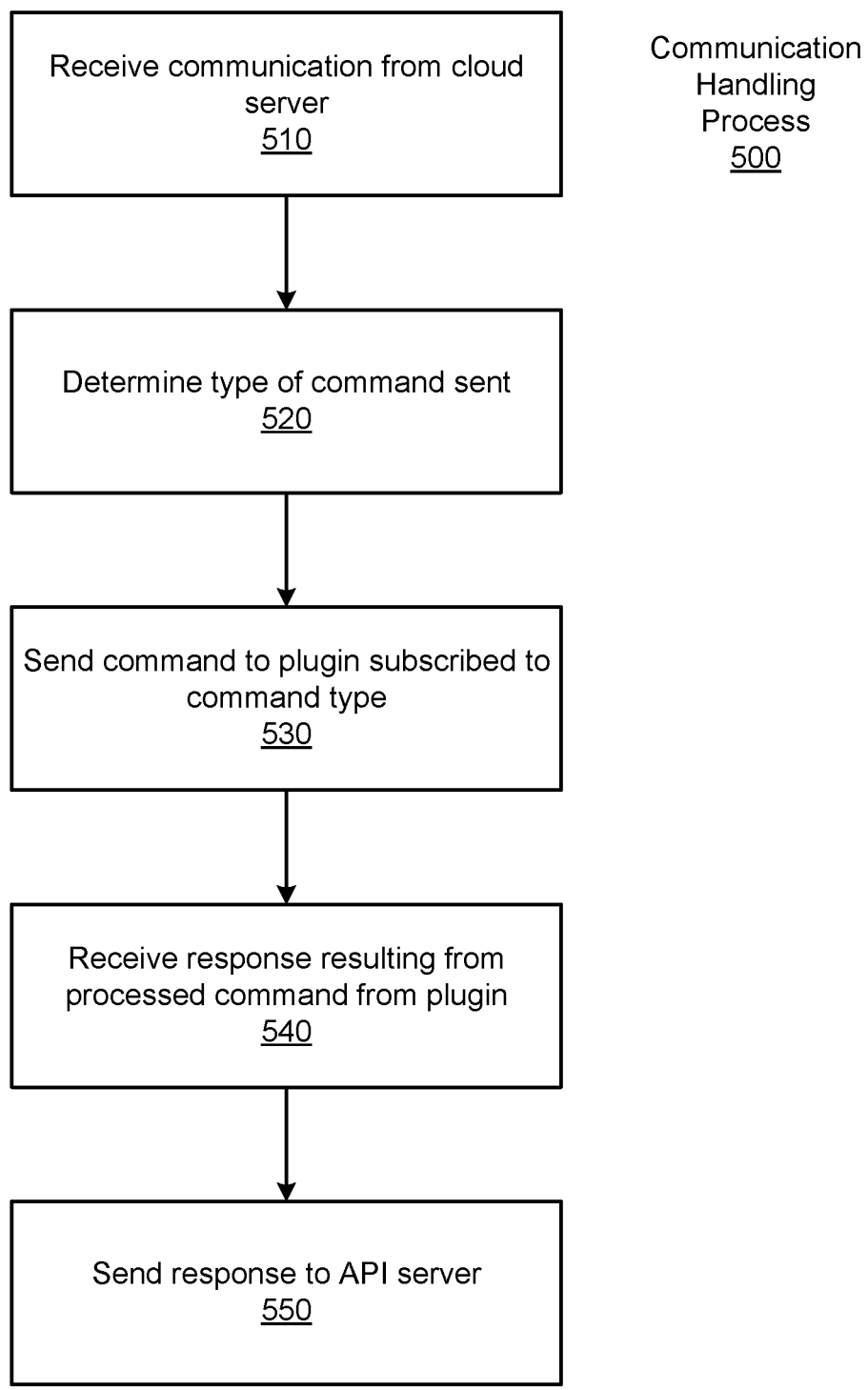
FIG. 5 is a diagram illustrating an embodiment of a communication handling process for a cloud-based endpoint security system.

FIG. 5 is a flow diagram illustrating a communication handling process 500 performed by the endpoint agent 300. The endpoint agent 300 receives 510 a communication originating from the cloud server 150 (e.g., from the API server 240 or the communication server 260).

The endpoint agent 300 determines 520 a command type of the command in the communication. For example, the command type may be indicated by a type identifier field included in the communication. The communication manager 370 performs a lookup of the command type in the communication table 390 to determine which plug-in 330 subscribes to the command type. Commands of a single type may be associated with multiple plug-ins. For example, plug-ins 330 that perform scanning activities may be able to handle at least some of the same types of commands as plug-ins 330 that perform real-time protection activities. The command is then sent 530 by the communication manager 370 to the subscribing plug-in 330. If the command cannot be associated with an installed plug-in, a message may optionally be returned to the cloud server 150 with an indication that the command is not supported. The plug-in 330 then executes an action associated with the command and a result is received 540 from the plug-in 330 at the communication manager 370. For example, the plug-in 330 could be prompted by the command to run a scan or change a configuration setting and report back with a result of the scan or an acknowledgement of the configuration change. The communication manager 370 sends 550 the response to the cloud server 150 (e.g., the API server 140).

The above-described architecture and processes beneficially provides a scalable cloud-based endpoint security platform. The endpoint agents carrying out the security policies on the endpoints can beneficially be configured in a modular manner using plug-ins, and the plug-ins can be updated independently of each other and independently of the endpoint agent engine.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for installing a plug-in to an endpoint security agent executing on an endpoint in a networked computer environment, the method comprising:
   installing a plug-in in an endpoint security agent;
   obtaining, from the plug-in, command type identifiers for a set of command types subscribed to by the plug-in;
   updating a communication table to store associations between the plug-in and each of the command type identifiers obtained from the plug-in;
   receiving a target command from the cloud server;
   identifying a target command type identifier from the target command received from the cloud server;
   determining, based on the communication table, a subscribing plug-in of the endpoint security agent associated with the target command type identifier in the target command; and
   sending the target command to the subscribing plug-in.

2. The method of claim 1, further comprising:
   receiving, from the subscribing plug-in in response to the target command, a response indicative of a result of the subscribing plug-in processing the target command; and
   sending the response to the cloud server.

3. The method of claim 1, further comprising:
   identifying a link to an address on the cloud server from where the plug-in can be downloaded; and
   downloading the plug-in using the link.

4. The method of claim 1, further comprising:
   obtaining, from the plug-in, a plug-in digital certificate indicative of authenticity of the plug-in;
   authenticating the plug-in digital certificate; and
   providing an endpoint agent digital certificate to the plug-in to enable the plug-in to verify authenticity of the endpoint security agent.

5. The method of claim 1, wherein the plug-in is configured to perform a security function including at least one of:
   a scanning function to detect malware installed on the endpoint,
   a real-time protection function to prevent malware from being installed on the endpoint,
   an administrative function to collect state information about the endpoint and provide the state information to the cloud server, and
   a remote desktop function to enable remote access to the endpoint from a remote administrative client.

6. The method of claim 1, further comprising:
   receiving a policy specifying an operating configuration of the endpoint security agent;
   identifying a currently installed plug-in that is not required by the policy; and
   uninstalling the currently installed plug-in in response to receiving the policy.

7. The method of claim 1, further comprising:
   identifying a new version of a currently installed plug-in is available; and
   obtaining the new version of the plug-in from a server.

8. A non-transitory computer-readable storage medium storing instructions for installing a plug-in to an endpoint security agent executing on an endpoint in a networked computer environment, the instructions when executed by a processor cause the processor to perform steps comprising:
   installing a plug-in in an endpoint security agent;
   obtaining, from the plug-in, command type identifiers for a set of command types subscribed to by the plug-in;
   updating a communication table to store associations between the plug-in and each of the command type identifiers obtained from the plug-in;
   receiving a target command from the cloud server;
   identifying a target command type identifier from the target command received from the cloud server;
   determining, based on the communication table, a subscribing plug-in of the endpoint security agent associated with the target command type identifier in the target command; and
   sending the target command to the subscribing plug-in.

9. The non-transitory computer-readable storage medium of claim 8, wherein the instructions when executed by the processor further cause the processor to perform steps including:
   receiving, from the subscribing plug-in in response to the target command, a response indicative of a result of the subscribing plug-in processing the target command; and
   sending the response to the cloud server.

10. The non-transitory computer-readable storage medium of claim 8, wherein the instructions when executed by the processor further cause the processor to perform steps including:
    identifying a link to an address on the cloud server from where the plug-in can be downloaded; and
    downloading the plug-in using the link.

11. The non-transitory computer-readable storage medium of claim 8, wherein the instructions when executed by the processor further cause the processor to perform steps including:
    obtaining, from the plug-in, a plug-in digital certificate indicative of authenticity of the plug-in;
    authenticating the plug-in digital certificate; and
    providing an endpoint agent digital certificate to the plug-in to enable the plug-in to verify authenticity of the endpoint security agent.

12. The non-transitory computer-readable storage medium of claim 8, wherein the plug-in is configured to perform a security function including at least one of:
    a scanning function to detect malware installed on the endpoint,
    a real-time protection function to prevent malware from being installed on the endpoint,
    an administrative function to collect state information about the endpoint and provide the state information to the cloud server, and
    a remote desktop function to enable remote access to the endpoint from a remote administrative client.

13. The non-transitory computer-readable storage medium of claim 8, wherein the instructions when executed by the processor further cause the processor to perform steps including:
    receiving a policy specifying an operating configuration of the endpoint security agent;
    identifying a currently installed plug-in that is not required by the policy; and
    uninstalling the currently installed plug-in in response to receiving the policy.

14. The non-transitory computer-readable storage medium of claim 8, wherein the instructions when executed by the processor further cause the processor to perform steps including:
    identifying a new version of a currently installed plug-in is available; and
    obtaining the new version of the plug-in from a server.

15. A computer system for implementing a security policy on a plurality of endpoints in a networked computer environment, the security system comprising:
- one or more computer processors; and
- one or more non-transitory computer-readable storage media, the storage media storing computer program instructions executable by the one or more computer processors to perform steps comprising:
  - installing a plug-in in an endpoint security agent;
  - obtaining, from the plug-in, command type identifiers for a set of command types subscribed to by the plug-in;
  - updating a communication table to store associations between the plug-in and each of the command type identifiers obtained from the plug-in;
  - receiving a target command from the cloud server;
  - identifying a target command type identifier from the target command received from the cloud server;
  - determining, based on the communication table, a subscribing plug-in of the endpoint security agent associated with the target command type identifier in the target command; and
  - sending the target command to the subscribing plug-in.

16. The computer system of claim 15, wherein the instructions when executed by the processor further cause the processor to perform steps including:
- receiving, from the subscribing plug-in in response to the target command, a response indicative of a result of the subscribing plug-in processing the target command; and
- sending the response to the cloud server.

17. The computer system of claim 15, wherein the instructions when executed by the processor further cause the processor to perform steps including:
- identifying a link to an address on the cloud server from where the plug-in can be downloaded; and
- downloading the plug-in using the link.

18. The computer system of claim 15, wherein the instructions when executed by the processor further cause the processor to perform steps including:
- obtaining, from the plug-in, a plug-in digital certificate indicative of authenticity of the plug-in;
- authenticating the plug-in digital certificate; and
- providing an endpoint agent digital certificate to the plug-in to enable the plug-in to verify authenticity of the endpoint security agent.

19. The computer system of claim 15, wherein the plug-in is configured to perform a security function including at least one of:
- a scanning function to detect malware installed on the endpoint,
- a real-time protection function to prevent malware from being installed on the endpoint,
- an administrative function to collect state information about the endpoint and provide the state information to the cloud server, and
- a remote desktop function to enable remote access to the endpoint from a remote administrative client.

20. The computer system of claim 15, wherein the instructions when executed by the processor further cause the processor to perform steps including:
- receiving a policy specifying an operating configuration of the endpoint security agent;
- identifying a currently installed plug-in that is not required by the policy; and
- uninstalling the currently installed plug-in in response to receiving the policy.

* * * * *